United States Patent
Brown

(10) Patent No.: US 12,080,154 B2
(45) Date of Patent: Sep. 3, 2024

(54) SMA HAPTIC ASSEMBLY

(71) Applicant: CAMBRIDGE MECHATRONICS LIMITED, Cambridge (GB)

(72) Inventor: Andrew Benjamin Simpson Brown, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 54 days.

(21) Appl. No.: 17/791,589

(22) PCT Filed: Jan. 8, 2021

(86) PCT No.: PCT/GB2021/050054
§ 371 (c)(1),
(2) Date: Jul. 8, 2022

(87) PCT Pub. No.: WO2021/140341
PCT Pub. Date: Jul. 15, 2021

(65) Prior Publication Data
US 2022/0383711 A1    Dec. 1, 2022

(30) Foreign Application Priority Data
Jan. 10, 2020    (GB) ..................................... 2000421

(51) Int. Cl.
*G08B 6/00*     (2006.01)
*F03G 7/06*     (2006.01)
*G06F 3/01*     (2006.01)

(52) U.S. Cl.
CPC ........... *G08B 6/00* (2013.01); *F03G 7/06143* (2021.08); *G06F 3/016* (2013.01)

(58) Field of Classification Search
None
See application file for complete search history.

(56) References Cited

U.S. PATENT DOCUMENTS

2012/0174571 A1\* 7/2012 Villanueva .......... F03G 7/06143
                                                            60/527
2012/0247934 A1\* 10/2012 Schmidt ................. H01H 19/14
                                                            200/336

(Continued)

FOREIGN PATENT DOCUMENTS

JP        2018 021467      2/2018
WO    WO 2019097848      5/2019

OTHER PUBLICATIONS

GB Search Report and Examination Report dated Oct. 20, 2020 of GB Application 2000421.4.

(Continued)

*Primary Examiner* — Daniel Previl
(74) *Attorney, Agent, or Firm* — Haley Guiliano LLP

(57) ABSTRACT

An SMA haptic assembly comprising: a length of SMA wire; and first and second parts that are movable relative to each other along a movement axis, the length of SMA wire being connected at each end to a respective support portion which is a portion of the first or second part; wherein each of the first and second parts comprises at least one contact portion and a connection portion which connects the at least one contact portion and any support portion of the respective one of the first and second parts; wherein the at least one contact portion of the first part and the at least one contact portion of the second part are relatively positioned so as to make contact with the length of SMA wire on opposite sides of the length of SMA wire along the movement axis and to guide the length of SMA wire along a tortuous path such that the first and second parts are driven apart along the movement axis on contraction of the length of SMA wire; and wherein the connection portion of the first body is a beam disposed on a side of the length of SMA wire in a direction normal to the movement axis.

14 Claims, 3 Drawing Sheets

(56) References Cited

U.S. PATENT DOCUMENTS

2016/0278845 A1\* 9/2016 Mayse ............... A61B 18/1815
2018/0284475 A1\* 10/2018 Howarth .............. G02B 27/646
2020/0117274 A1\* 4/2020 Brown .................... G06F 3/016

OTHER PUBLICATIONS

International Search Report and Written Opinion of PCT/GB2021/050054 dated Apr. 12, 2021.

\* cited by examiner

SMA HAPTIC ASSEMBLY

CROSS-REFERENCE TO RELATED APPLICATIONS

This application is a national stage application under 35 U.S.C. § 371 of International Application No. PCT/GB2021/050054, filed Jan. 8, 2021, which claims priority of GB Patent Application No. 2000421.4, filed Jan. 10, 2020, the disclosures of each of which are hereby incorporated by reference herein in their entireties.

The present invention relates to actuators using shape memory alloy (SMA) wires to produce relative movement between two components. In particular it relates to reducing the size (e.g. height) of such actuators used in haptic assemblies.

SMA actuators are known for use in handheld electronic devices, such as cameras and mobile phones. In particular, they can be used to provide haptic functionality for tactile feedback, for example in response to a user selecting a particular area of a screen or pressing a button. Such actuators typically function by using the contraction of an SMA wire to cause relative motion of two components. The SMA wire is in contact with parts of two opposing bodies which are forced apart due to the change in length of the SMA wire as it contracts. The tactile feedback may be in the form of a 'click' sensation, vibrations, or similar.

The space available for components inside handheld or mobile devices is at a premium in order to reduce their size and weight, or to be able to fit additional components and functionality into the device. Therefore, it is desirable to provide an SMA haptic assembly that has reduced size, without affecting the functionality of the assembly. It is an aim of the present invention to provide such an assembly.

According to the present invention, there is provided an SMA haptic assembly comprising: a length of SMA wire; and first and second parts (also referred to herein as 'bodies') that are movable relative to each other along a movement axis, the length of SMA wire being connected at each end to a respective support portion which is a portion of the first or second part; wherein each of the first and second parts comprises at least one contact portion (also referred to herein as a 'tooth') and a connection portion which connects the at least one contact portion and any support portion of the respective one of the first and second parts; wherein the at least one contact portion of the first part and the at least one contact portion of the second part are relatively positioned so as to make contact with the length of SMA wire on opposite sides of the length of SMA wire along the movement axis and to guide the length of SMA wire along a tortuous path such that the first and second parts are driven apart along the movement axis on contraction of the length of SMA wire; and wherein the connection portion of the first body is a beam disposed on a side of the length of SMA wire in a direction normal to the movement axis.

By connecting together the parts of the first body using a beam disposed on a side of the length of SMA wire, the size of the assembly can be reduced compared to the typical case where the parts of the first body are connected together by a section of the body above the length of SMA wire along the movement direction. This is because the beam and the length of SMA wire can overlap in a direction parallel to the movement axis, which would not be possible if the beam were disposed above the length of SMA wire.

In some embodiments, in a direction parallel to the movement axis in which the first body moves relative to the second body on contraction of the length of SMA wire, the beam of the first body does not extend beyond the end of the at least one tooth of the second body by more than an amount equal to 25% of the extent of the length of SMA wire parallel to the movement axis. In some embodiments, in a direction parallel to the movement axis in which the first body moves relative to the second body on contraction of the length of SMA wire, the beam of the first body does not extend beyond the end of the at least one tooth of the second body by more than 500 μm. Limiting how far beyond the length of SMA wire the beam may extend ensures that a sufficient reduction in size of the SMA haptic assembly is achieved.

In some embodiments, the first body comprises two beams connecting said parts of the first body, the two beams being disposed on opposite sides of the length of SMA wire along an axis normal to the movement axis. Using two beams on opposite sides of the length of SMA wire provides improved structural properties for the first body, making the response of the first body to applied forces more symmetrical. It may also allow the first body to be more easily connected on either side to other parts of the SMA haptic assembly, or to a device in which the SMA haptic assembly is used.

In some embodiments, the second body further comprises a beam connecting parts of the second body including the at least one tooth and any support portion that form part of the second body, the beam being disposed on a side of the length of SMA wire in a direction normal to the movement axis. Providing a beam on the second body as well as the first body allows for a greater saving in size of the SMA haptic assembly, as both bodies can be reduced in size.

In some embodiments, in a direction parallel to the movement axis in which the second body moves relative to the first body on contraction of the length of SMA wire, the beam of the second body does not extend beyond the end of the at least one tooth of the first body by more than an amount equal to 25% of the extent of the length of SMA wire parallel to the movement axis. In some embodiments, in a direction parallel to the movement axis in which the second body moves relative to the first body on contraction of the length of SMA wire, the beam of the second body does not extend beyond the end of the at least one tooth of the first body by more than 500 μm. Limiting the amount by which the beam of the second body extends has a similar benefit as for the beam of the first body, ensuring that a sufficient reduction in size is achieved.

In some embodiments, the second body comprises two beams connecting said parts of the second body, the beams being disposed on opposite sides of the length of SMA wire along an axis normal to the movement axis. Using two beams on opposite sides of the length of SMA wire provides improved structural properties for the second body, making the response of the second body to applied forces more symmetrical. It may also allow the second body to be more easily connected on either side to other parts of the SMA haptic assembly, or to a device in which the SMA haptic assembly is used.

In some embodiments, the length of SMA wire is connected at each end to a respective support portion forming part of the first body, whereby no support portions form part of the second body. Connecting both ends of the length of SMA wire to the same one of the bodies means that no force is created between the two bodies in a direction other than the movement direction when the length of SMA wire contracts.

In some embodiments, the first body comprises plural teeth. In some embodiments, the second body comprises plural teeth. Using plural teeth allows the SMA haptic assembly to exert a greater force between the two bodies by having more sections of the length of SMA wire that contract to drive apart the bodies.

In some embodiments, the length of SMA wire is connected to the respective support portions by respective connection portions which hold the SMA wire. Connection portions provide a specific point of contact between the length of SMA wire and the support portion that can be used to define the length of the SMA wire that contributes to creating relative movement between the bodies.

In some embodiments, the connection portions are crimp portions. Crimp portions can be used to provide electrical connections to the length of SMA wire, and are quick to assemble during manufacture of the SMA haptic assembly.

In some embodiments, the length of SMA wire is in contact with at least one of the first body and the second body along at least substantially all of its length, thereby enabling more uniform heating/cooling.

Embodiments of the invention will now be described by way of non-limitative example with reference to the accompanying drawings, in which.

Figure 1:
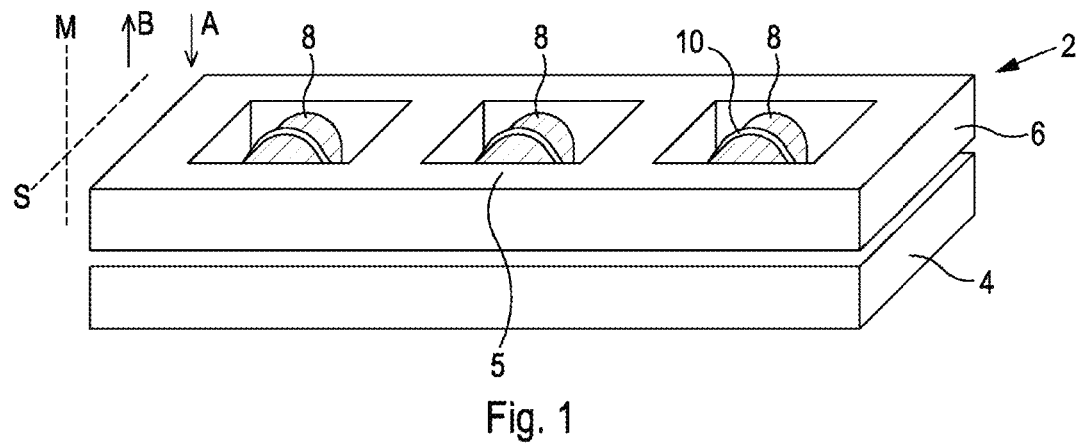
FIG. 1 shows an SMA haptic assembly in isometric view.

Shape memory alloy (SMA) haptic assemblies 2 according to the present invention are shown in FIGS. 1 to 6. The SMA haptic assembly 2 comprises first and second bodies 4, 6 that are movable relative to each other along a movement axis M. In haptics applications, the relative movement of the first and second bodies 4, 6 provides the haptic effect to the user. The SMA haptic assembly 2 may be used in applications such as mobile phones, wearable devices, cameras, computer accessories such as trackpads, media players, portable digital assistants (PDAs), or other mobile devices.

Although not shown in FIGS. 1 to 6, the SMA haptic assembly 2 may comprise a suspension system which holds the first and second bodies 4, 6 relative to one another and allows them to move along the movement axis M. The suspension system may permit movement of the first and second bodies 4, 6 relative to one another along the movement axis M, while restricting or preventing relative movement of the first and second bodies 4, 6 in the plane perpendicular to the movement axis M. The suspension system (or some other arrangement) may also restrict or prevent relative rotation of the first and second bodies 4, 6, for example due to an off-centre force applied to the SMA haptic assembly 2 by a user.

In some embodiments, the SMA haptic assembly 2 includes an arrangement (e.g. a resilient element such as a spring) to provides a force ("a return force") urging the first and second bodies 4, 6 together along the movement axis M such that, when the power to the length of SMA wire 10 is reduced or stopped, the length of SMA wire 10 expands as it cools and the first and second bodies 4, 6 move back e.g. towards the resting position. In other embodiments, the SMA haptic assembly 2 does not include such an arrangement, in which case the return force can be provided by a user (e.g. by a finger press) on an area of the electronic device to which the SMA haptic assembly 2 is coupled.

In some embodiments, the SMA haptic assembly 2 is integrated into a larger device. In some embodiments, one of the first and second bodies 4, 6 may be a static body, which does not move relative to the device during actuation of the SMA haptic assembly 2, and the other of the first and second bodies 4, 6 a moving body which does move relative to the device during actuation of the SMA haptic assembly 2. Alternatively, both bodies 4, 6 may move during actuation. Either or both of the first and second bodies 4, 6 may be manufactured using injection moulding, or by stamping or chemically etching sheet metal.

In this example the first body 4 has a single tooth 8 and the second body has two teeth 8, although more generally the first and second bodies 4, 6 could be modified to have any number of teeth 8.

The shape of the teeth 8 can be any suitable shape to provide contact with the length of SMA wire 10. In the embodiments shown in the figures, the uppermost portion of the teeth 8 has a curved, or wave-like shape. However, other shapes could be used. For example, the uppermost portion of the teeth 8 may be pointed, or the uppermost portion of the teeth 8 may be flat.

The teeth of the first and second bodies 4, 6 alternate in a direction normal to the movement axis M. This means that for any tooth 8 on either of the first and second bodies 4, 6, the nearest adjacent tooth 8 will be a tooth 8 of the other of the first and second bodies 4, 6. The teeth overlap in a direction parallel to the movement axis M. The overlapping of the teeth means that the uppermost portion of a tooth 8 on the lower body is above the lowermost portion of the adjacent teeth 8 of the upper body (where 'up' for this purpose is defined as being in the direction of movement of the second body 6 relative to the first body 4 on contraction of the length of SMA wire 10. In the embodiments shown in the figures, the first body 4 is the lower body and the second body 6 is the upper body. However, in other embodiments, the first body 4 may be the upper body, and the second body 6 the lower body. In some embodiments, the first body 4 comprises plural teeth. In some embodiments, the second body comprises plural teeth. Providing plural teeth on one or both of the first and second bodies 4, 6 increases the total force applied by the length of SMA wire 10 between the first and second bodies 4, 6 while minimising the extent of the length of SMA wire 10 along the movement axis M.

The SMA haptic assembly 2 further comprises a length of SMA wire 10 connected at each end to a respective support portion 17 forming part of one of the first and second bodies 4, 6. In some embodiments, the ends of the length of SMA wire 10 are connected to respective support portions 17 forming parts of different ones of the first and second bodies 4, 6. For example, a first end of the length of SMA wire 10 may be connected to a support portion 17 forming part of one of the first and second bodies 4, 6, and a second end of the length of SMA wire 10 may be connected to a support portion 17 forming part of the other of the first and second bodies 4, 6. Preferably, the length of SMA wire 10 is connected at each end to a respective support portion 17 forming part of the same one of the first and second bodies 4, 6. Connecting both ends to the same one of the first and second bodies 4, 6 reduces the force between the first and second bodies 4, 6 in a direction perpendicular to the movement axis M during actuation of the SMA haptic assembly 2. This reduces strain on any suspension system, and maximises the component of the force that is applied between the first and second bodies 4, 6 in the desired direction along the movement axis.

Figure 2:
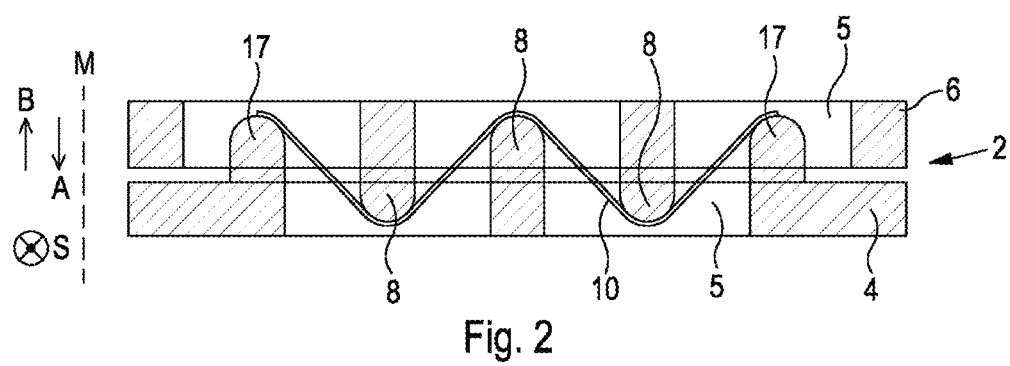
FIG. 2 is a side view of the SMA haptic assembly of FIG. 1.
Figure 3:
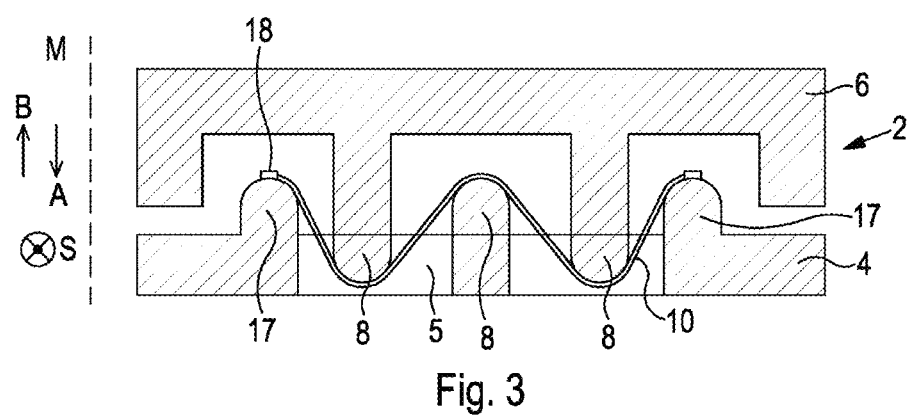
FIG. 3 is a view of an SMA haptic assembly in which only the first body comprises a beam.
Figure 4:
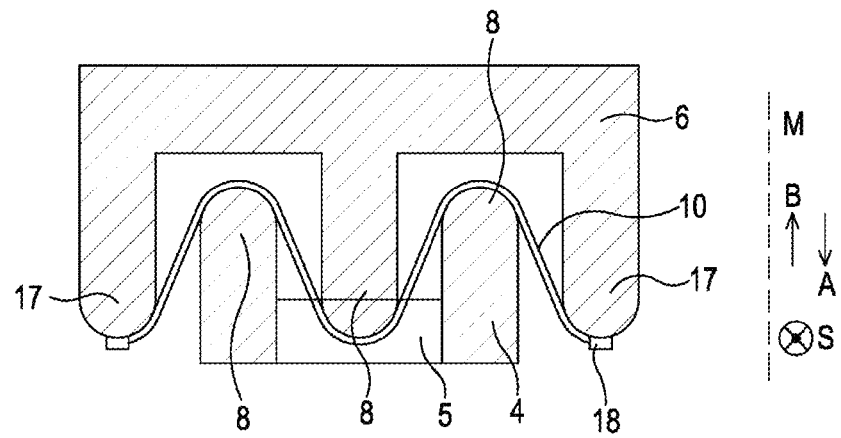
FIG. 4 is a view of an SMA haptic assembly in which the first body does not comprise a support portion.

In the embodiments of FIGS. 1-3, the length of SMA wire 10 is connected at each end to a respective support portion 17 forming part of the first body 4, whereby no support portions 17 form part of the second body 6. Alternatively, as shown in FIG. 4, the length of SMA wire 10 may be connected at each end to a respective support portion 17 forming part of the second body 6, whereby no support portions 17 form part of the first body 4. Where both ends of the length of SMA wire 10 are connected to the same one of the first and second bodies 4, 6, there is no need for the other of the first and second bodies 4, 6 to comprise a support portion 17. However, as shown in FIGS. 1 and 2, where both ends of the length of SMA wire 10 are connected to the same one of the first and second bodies 4, 6, the other of the first and second bodies 4, 6 may comprise one or more additional portions extending beyond the end of the length of SMA wire 10 in a direction perpendicular to the movement axis M. The inclusion of additional portions may be desirable in order that the length of the first and second bodies 4, 6 is the same in a direction perpendicular to the movement axis M.

In some embodiments, the length of SMA wire 10 is connected to the respective support portions 17 by respective connection portions 18 which hold the SMA wire. Any suitable means or wire attachment device may be used as the connection portion 18 to hold the SMA wire. For example, the connection portion 18 may comprise an adhesive, where the SMA wire is set into the adhesive before curing the adhesive. Alternatively, the connection portion 18 may comprise a hook or dowel pin around which the length of SMA wire 10 is secured. In some embodiments, the connection portions 18 are crimp portions. The crimp portion may be fixed to either of the first and second bodies 4, 6. The crimp portions crimp the ends of the length of SMA wire 10. Crimping may be achieved by compressing the SMA wire between two pieces of deformable material. Using a metal crimp portion may be desirable, in particular where the crimp portion is used to make electrical connection to the length of SMA wire 10 as well as fixing the length of SMA wire 10 to the first and second bodies 4, 6. It is not necessary for both connection portions 18 to be identical. For example, one of the connection portions 18 may comprise a crimp portion, and the other of the connection portions 18 may comprise a hook, dowel pin, or adhesive, as described above.

The length of SMA wire 10 extends along a tortuous path in between the first and second bodies 4, 6 and making contact with the teeth 8 so that the first and second bodies 4, 6 are driven apart along the movement axis M on contraction of the length of SMA wire 10. The tortuous path is any path which is not a straight line between the points at which the ends of the length of SMA wire 10 are connected to the bodies 4, 6. The tortuous path followed by the length of SMA wire 10 will therefore have a length which is greater than the shortest distance between the connection portions 18. The tortuosity of the tortuous path may be measured using a ratio of the length of the tortuous path to the shortest distance between the connection portions 18. The length of SMA wire 10 is arranged so that when the length of SMA wire 10 contracts, the two bodies 4, 6 move away from each other. This is caused by the overlapping of the teeth 8 of the two bodies 4, 6, such that a force is exerted on the teeth 8 by the length of SMA wire 10 as it contracts.

In FIGS. 1 to 5, the first body 4 comprises two beams 5 connecting said parts of the first body 4, the two beams 5 being disposed on opposite sides of the length of SMA wire 10 along an axis S normal to the movement axis M. The axis S is shown in FIG. 1, and is an axis into/out of the plane of the page in FIGS. 2 to 5. However, this is not essential, and the first body 4 may comprise a beam 5 on only one side of the length of SMA wire 10 along an axis S normal to the movement axis M. Having the first body 4 comprise beams 5 on both sides of the length of SMA wire 10 may be preferred, as this will improve the strength of the first body 4 and its ability to resist unwanted deformation under the forces applied by the length of SMA wire 10 when the length of SMA wire 10 contracts, or by external forces. The beams 5 of the first body 4 connect parts of the first body 4 including the at least one tooth 8 and any support portion 17 that forms part of the first body 4.

Each of the beams 5 is disposed on a side of the length of SMA wire 10 along an axis S normal to the movement axis M. The axis S normal to the movement axis M is in a plane perpendicular to the movement axis M and substantially perpendicular to the extent of the length of SMA wire 10 in the plane perpendicular to the movement axis M. As shown in FIGS. 2 to 5, this means that the beam 5 of the first body 4 overlaps with the length of SMA wire 10 in a direction parallel to the movement axis M. In particular, the beam 5 of the first body 4 overlaps in a direction parallel to the movement axis M with a point on the length of SMA wire 10 where the length of SMA wire 10 makes contact with a tooth of the second body 6. For example, as shown in FIG. 3, the uppermost part of the beam 5 of the first body 4 is above the lowermost point on the length of SMA wire 10 (where 'up' for this purpose is defined as being in the direction of movement of the second body 6 relative to the first body 4 on contraction of the length of SMA wire 10). By placing the beam 5 that connects together parts of the first body 4 on the side of the length of SMA wire 10, the thickness of the first body 4 in a direction parallel to the movement axis M can be reduced. Therefore, the overall thickness of the SMA haptic assembly 2 in the direction parallel to the movement axis M is also reduced.

Figure 5:
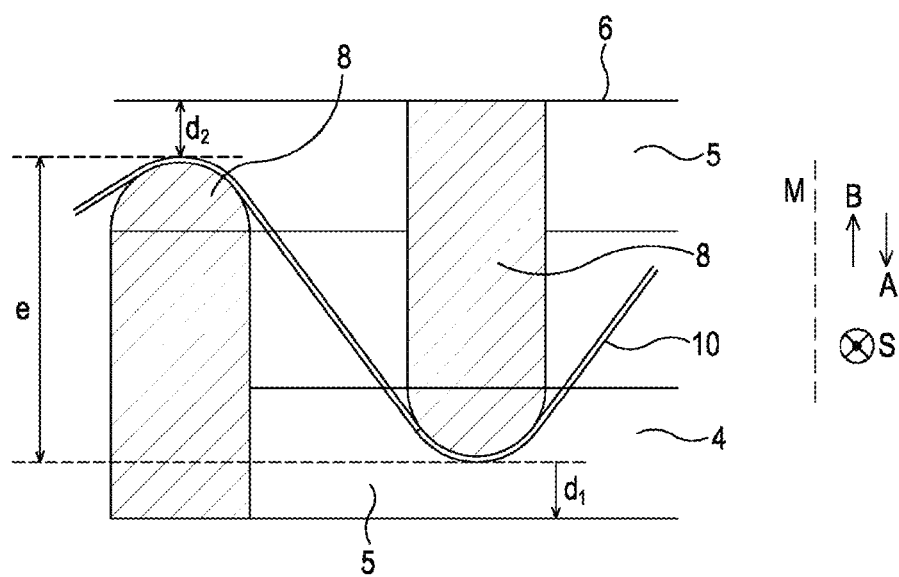
FIG. 5 is a close-up of two teeth of an SMA haptic assembly showing the extent of the length of SMA wire parallel to the movement axis.
Figure 6:
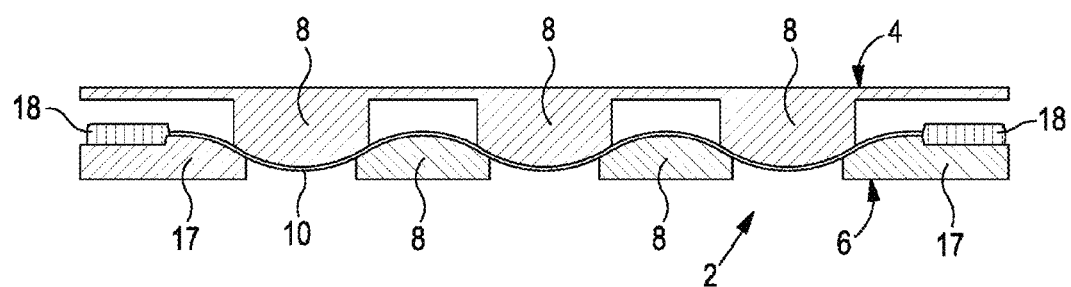
FIG. 6 is a cross-sectional view of an SMA haptic assembly in which the length of SMA wire is in contact with the first body or with the second body along its length.

FIGS. 1, 2, and 5 show embodiments in which the second body 6 further comprises two beams 5 connecting parts of the second body 6 including the at least one tooth 8 and any support portion 17 that forms part of the second body 6, the beam 5 being disposed on a side of the length of SMA wire 10 along an axis S normal to the movement axis M. The axis S normal to the movement axis M is the same as for the beams 5 of the first body 4. The beam 5 of the second body 6 may be provided in substantially the same way as for the beam 5 of the first body 4. For example, the second body 6 may comprise a beam 5 on only one side of the length of SMA wire 10 along an axis S normal to the movement axis M. The beam 5 of the second body 6 overlaps with the length of SMA wire 10 in a direction parallel to the movement axis M. In particular, the beam 5 of the second body 6 overlaps in a direction parallel to the movement axis M with a point on the length of SMA wire 10 where the length of SMA wire 10 makes contact with a tooth of the first body 6. For example, as shown in FIG. 2, the lowermost part of the beam 5 of the second body 6 is below the uppermost point on the length of SMA wire 10 (where 'up' for this purpose is defined as being in the direction of movement of the second body 6 relative to the first body 4 on contraction of the length of SMA wire 10). By placing the beam 5 that connects together parts of the second body 6 on the side of the length of SMA wire 10, the thickness of the second body 6 in a direction parallel to the movement axis M can be reduced. Therefore, the overall thickness of the SMA haptic assembly 2 in the direction parallel to the movement axis M is also reduced. Similarly as for the first body 4, in some embodiments, the second body 6 comprises two beams 5 connecting said parts of the second body 6, the beams 5 being disposed on opposite sides of the length of SMA wire 10 along an axis S normal to the movement axis M.

In some embodiments, in a direction A parallel to the movement axis M in which the first body 4 moves relative to the second body 6 on contraction of the length of SMA wire 10, the beam 5 of the first body 4 does not extend beyond the end of the at least one tooth 8 of the second body 6 by more than an amount equal to 25%, preferably 15%, more preferably 10%, most preferably 5% of the extent e of the length of SMA wire 10 parallel to the movement axis M. In the figures, the first body 4 is the lower of the first and second bodies 4, 6, and so the direction A in which the first body 4 moves relative to the second body 6 is downwards in the figures, in the direction of the arrow labelled A.

This constraint is illustrated in further detail in FIG. 5. The extent e of the length of SMA wire 10 parallel to the movement axis M is the distance between the uppermost point on the length of SMA wire 10 along the movement axis M and the lowermost point on the length of SMA wire 10 along the movement axis M, projected onto the movement axis M. This will be the largest distance along the movement axis M between any two points on the length of SMA wire 10. In some embodiments, the points on the length of SMA wire 10 that define the extent e of the length of SMA wire 10 parallel to the movement axis M will both be points at which the length of SMA wire 10 is in contact with a tooth 8 of one of the first and second bodies 4, 6. However, in some cases, one or both of the points may be points at which the length of SMA wire 10 is connected to a support portion 17.

In FIG. 5, the beam 5 of the first body 4 extends beyond the end of the at least one tooth 8 of the second body 6 in a direction parallel to the movement axis M by a distance $d_1$. This distance $d_1$ is at most 25%, preferably 15%, more preferably 10%, or most preferably 5% of the extent e of the length of SMA wire 10.

In embodiments such as shown in FIG. 5, where both the first and second bodies 4, 6 comprise a beam 5, this constraint may apply to the distances $d_1$, $d_2$ by which both the beam 5 of the first body 4 and the beam 5 of the second body 6 extend. In some embodiments, in a direction B parallel to the movement axis M in which the second body 6 moves relative to the first body 4 on contraction of the length of SMA wire 10, the beam 5 of the second body 6 does not extend beyond the end of the at least one tooth 8 of the first body 4 by more than an amount equal to 25%, preferably 15%, more preferably 10%, or most preferably 5% of the extent e of the length of SMA wire 10 parallel to the movement axis M. In the figures, the second body 6 is the upper of the first and second bodies 4, 6, and the direction B in which the second body 6 moves relative to the first body 4 on contraction of the length of SMA wire 10 is upwards in the figures, in the direction along the arrow labelled B. In FIG. 5 the beam 5 of the second body 6 extends beyond the end of the at least one tooth 8 of the first body 4 in a direction parallel to the movement axis M by the distance $d_2$. This distance $d_2$ is at most 25%, preferably 15%, more preferably 10%, or most preferably 5% of the extent e of the length of SMA wire 10.

In some embodiments, the limitation on the extent of the beam 5 may be a limitation in terms of an absolute distance. In some embodiments, in a direction parallel to the movement axis M in which the first body 4 moves relative to the second body 6 on contraction of the length of SMA wire 10, the beam 5 of the first body 4 does not extend beyond the end of the at least one tooth 8 of the second body 6 by more than 500 μm, preferably 300 μm, more preferably 200 μm. In some embodiments where the second body 6 comprises a beam 5, in a direction parallel to the movement axis M in which the second body 6 moves relative to the first body 4 on contraction of the length of SMA wire 10, the beam 5 of the second body 6 does not extend beyond the end of the at least one tooth 8 of the first body 4 by more than 500 μm, preferably 300 μm, more preferably 200 μm.

A greater reduction in the size of the SMA haptic assembly 2 is achieved the smaller the distances $d_1$ and $d_2$ by which the beams 5 of one of the first and second bodies 4, 6 extend beyond the end of the tooth 8 of the other of the first and second bodies 4, 6. In some embodiments, the beam 5 of the first body 4 does not extend beyond the end of the at least one tooth 8 of the second body 6 in a direction A parallel to the movement axis M in which the first body 4 moves relative to the second body 6 on contraction of the length of SMA wire 10. In some embodiments where the second body 6 comprises a beam 5, the beam 5 of the second body 6 does not extend beyond the end of the at least one tooth 8 of the first body 4 in a direction B parallel to the movement axis M in which the second body 6 moves relative to the first body 4 on contraction of the length of SMA wire 10. When both of these conditions are true, this would remove all material of the first and second bodies 4, 6 that, combined with the extent of the length of SMA wire 10, determines the size of the SMA haptic assembly 2 in a direction along the movement axis M. In this case, the size of the SMA actuator device 2 in a direction along the movement axis M is determined only by the extent of the length of SMA wire 10. This would achieve the maximum possible reduction in size of the SMA haptic assembly 2. This may not be desirable in all applications, because the length of SMA wire 10 would be exposed, and may be at increased risk of wear or damage.

In embodiments such as shown in FIG. 3, the length of SMA wire 10 has a significant proportion of its length where it is not in contact with either the first body 4 or the second body 6. In contrast, in the embodiment shown in FIG. 6, at least substantially all of the length of SMA wire 10 is in contact with at least one of the first body 4 and the second body 6 in the resting position. Such an embodiment may be advantageous as it has more uniform heating/cooling due to the thermal contact between the length of SMA wire 10 and the bodies 4, 6.

The invention claimed is:

1. An SMA haptic assembly comprising:
a length of SMA wire; and
first and second parts that are movable relative to each other along a movement axis, the length of SMA wire being connected at each end to a respective support portion which is a portion of the first or second part;
wherein each of the first and second parts comprises at least one contact portion and a connection portion which connects the at least one contact portion and any support portion of the respective one of the first and second parts;
wherein the at least one contact portion of the first part and the at least one contact portion of the second part are relatively positioned so as to make contact with the length of SMA wire on opposite sides of the length of SMA wire along the movement axis and to guide the length of SMA wire along a tortuous path such that the first and second parts are driven apart along the movement axis on contraction of the length of SMA wire; and wherein the connection portion of the first part is a beam disposed on a side of the length of SMA wire in a direction normal to the movement axis.

2. The SMA haptic assembly according to claim 1, wherein, in a direction parallel to the movement axis, the beam of the first part does not extend beyond the end of the at least one contact portion of the second part by more than an amount equal to 25%, preferably 15%, more preferably 10%, or most preferably 5% of the extent of the length of SMA wire parallel to the movement axis.

3. The SMA haptic assembly according to claim 1, wherein, in a direction parallel to the movement axis, the beam of the first part does not extend beyond the end of the at least one contact portion of the second part by more than 500 μm, preferably 300 μm, preferably 200 μm.

4. The SMA haptic assembly according to claim 1, wherein the first part comprises two beams connecting said portions of the first part, the two beams being disposed on opposite sides of the length of SMA wire along an axis normal to the movement axis.

5. The SMA haptic assembly according to claim 1, wherein the second part further comprises a beam connecting portions of the second part including the at least one contact portion and any support portion which is a portion of the second part, the beam being disposed on a side of the length of SMA wire in a direction normal to the movement axis.

6. The SMA haptic assembly according to claim 5, wherein, in a direction parallel to the movement axis, the beam of the second part does not extend beyond the end of the at least one contact portion of the first part by more than an amount equal to 25%, preferably 15%, more preferably 10%, or most preferably 5%, of the extent of the length of SMA wire parallel to the movement axis.

7. The SMA haptic assembly according to claim 5, wherein in a direction parallel to the movement axis in which the second part moves relative to the first part on contraction of the length of SMA wire, the beam of the second part does not extend beyond the end of the at least one contact portion of the first part by more than 500 μm, preferably 300 μm, preferably 200 μm.

8. The SMA haptic assembly according to claim 5, wherein the second part comprises two beams connecting said portions of the second part, the beams being disposed on opposite sides of the length of SMA wire along an axis normal to the movement axis.

9. The SMA haptic assembly according to claim 1, wherein the length of SMA wire is connected at each end to a respective support portion which is a portion of the first part, whereby no support portions form part of the second part.

10. The SMA haptic assembly according to claim 1, wherein the first part comprises plural contact portions.

11. The SMA haptic assembly according to claim 1, wherein the second part comprises plural contact portions.

12. The SMA haptic assembly according to claim 1, wherein the length of SMA wire is connected to the respective support portions by respective connection portions which hold the SMA wire.

13. The SMA haptic assembly according to claim 12, wherein the connection portions are crimp portions.

14. The SMA haptic assembly according to claim 1, wherein the length of SMA wire is in contact with at least one of the first part and the second part along at least substantially all of its length.

* * * * *